No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 1.

Witnesses:
James L. Norris, Jr.

Inventor
Theodor Scheimpflug
By James L. Norris
Atty.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 2.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 5.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 6.

Witnesses: Inventor
Theodor Scheimpflug
By James L. Norris.
Atty.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 7.

Witnesses:

Inventor
Theodor Scheimpflug
By James L. Norris.
Atty.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 8.

Witnesses:
James L. Norris, Jr.

Inventor
Theodor Scheimpflug
By
James L. Norris.
Atty.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 9.

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 10.

Fig.11.

Fig.11$^{\alpha}$.

Witnesses
Inventor
Theodor Scheimpflug
By James L. Norris.
Atty

No. 752,596. PATENTED FEB. 16, 1904.
T. SCHEIMPFLUG.
APPARATUS FOR THE SYSTEMATIC ALTERATION OF PLANE PICTURES
BY MEANS OF SPHERICAL LENSES OR MIRRORS.
APPLICATION FILED MAR. 31, 1903.
NO MODEL. 11 SHEETS—SHEET 11.

Witnesses
Inventor
Theodor Scheimpflug
By
James L. Norris
Atty.

No. 752,596. Patented February 16, 1904.

UNITED STATES PATENT OFFICE.

THEODOR SCHEIMPFLUG, OF VIENNA, AUSTRIA-HUNGARY.

APPARATUS FOR THE SYSTEMATIC ALTERATION OF PLANE PICTURES BY MEANS OF SPHERICAL LENSES OR MIRRORS.

SPECIFICATION forming part of Letters Patent No. 752,596, dated February 16, 1904.

Application filed March 31, 1903. Serial No. 150,490. (No model.)

*To all whom it may concern:*

Be it known that I, THEODOR SCHEIMPFLUG, a subject of the Emperor of Austria-Hungary, residing at Vienna, in the Province of Lower Austria, in the Empire of Austria-Hungary, have invented certain new and useful Improvements in Apparatus for the Systematic Alteration of Plane Pictures by Means of Spherical Lenses or Mirrors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The method for the systematic alteration of plane images by means of spherical lenses or mirrors, as described in the application for Letters Patent, Serial No. 150,489, may be considerably facilitated by the use of apparatus which facilitate or secure by their construction the conditions defined therein for producing clearness of definition of images in planes inclined to one another and also affinity in a combination of two projective systems. These conditions are:

(*a*) *For clearness of definition of image.*—First, the plane of the original, the plane of the image, and the objective plane or vertex-plane of the mirror must intersect one another in the same straight line; second, the counter-axes of the perspective system must always be situated in the focal planes.

(*b*) *As regards affinity.*—When an affinite alteration of an image is considered as the sum or as the difference of two projective alterations of the image, then their common intermediate image must also have the same counter-axis in both projective systems. The first step in the provision of practical apparatus was the adaptation of photographic reproducing apparatus in such a manner that the plane of the original and the plane of its image can be inclined to the optical axis of the objective; but in apparatus of this kind the clearness of definition of the image is the sole criterion of the proper adjustment. Consequently such apparatus are incomplete, inconvenient, and not capable of accurate work. An essential and industrially new improvement on these known constructions consists in the provision of sighting devices in the planes of the original and its image which allow of controlling the exact intersection of the two planes with the objective plane in the same straight line—that is to say, of satisfying the first condition of clearness of definition. Another way of attaining the same object, but which entails a special modification of ordinary photographic reproducing apparatus when employed for these purposes and which constitutes a great constructional improvement consists in combining the holders or supports of the objective and of the original and its image constructionally in such a manner that they will always intersect one another in a straight line. Further, by taking care that the second condition for clearness of definition of the image is satisfied automatically, then types of apparatus are evolved which render all preparatory calculation unnecessary in the case of projective alterations of image, because the clearness of definition of the image is already constantly provided for, and as the projective alterations of the image in such apparatus take place according to very simple and clear laws and as they are the only matter which the operator has to consider they may readily be carried out in a purely empiric manner. The apparatus which satisfy automatically the two conditions of clearness of definition of the image are therefore industrially the most valuable part of the present invention; but for the most industrial purposes projective alterations of image are generally of less importance than affinite alterations of image. In the latter case apparatus are important which enable affinite alterations of image to be effected without any intermediate process. These have been produced constructively by the combination or the arrangement in series of two apparatus for projective alterations in which the intermediate image (which, together with its counter-axis, is common to both projective systems) remains merely an aerial or imaginary image.

In the accompanying drawings, Figures 1,

1ᵃ, 1ᵇ, and 1ᶜ are respectively a side elevation, a plan, and two detailed views of what is known as a "slide apparatus" for projective alterations of image. Fig. 3ᵇ illustrates as an appurtenant detail a turn-table, which is also employed in all the other apparatus.

Figure 1:
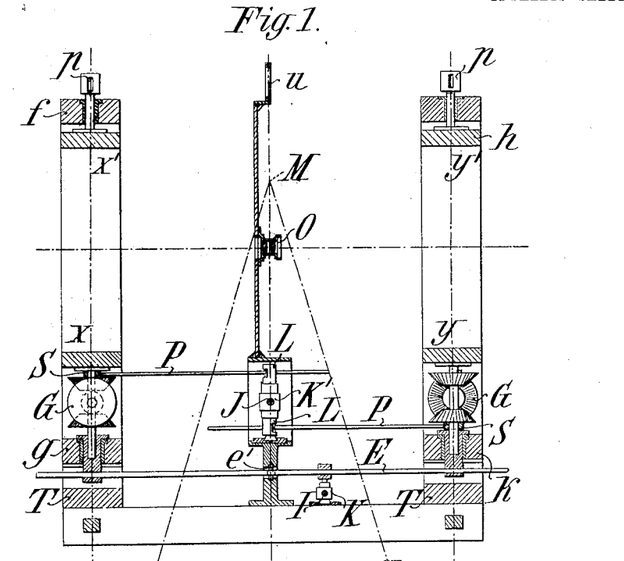
Figure 1A:
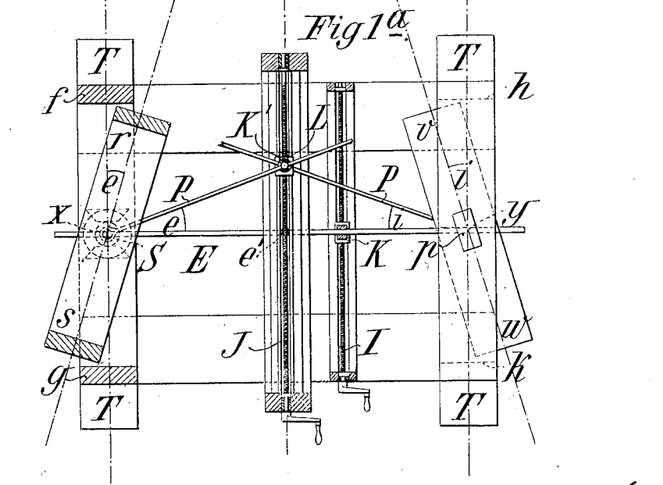
Figure 1B:
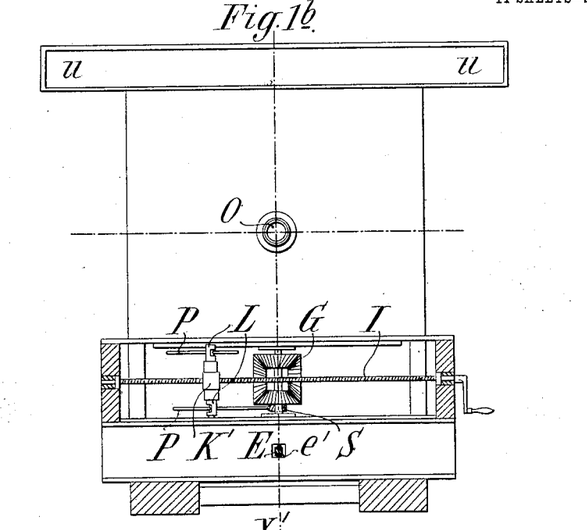
Figure 1C:
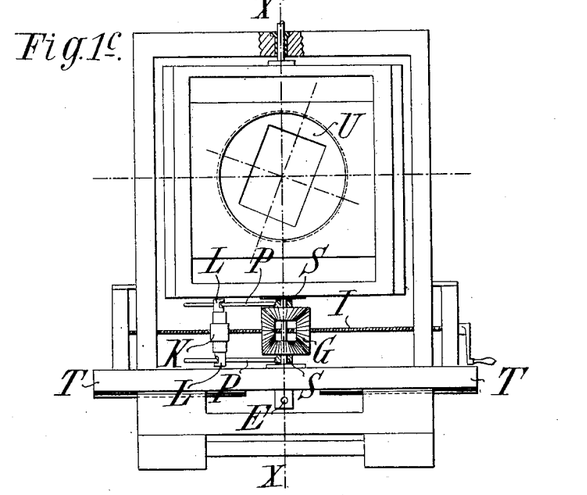
Figure 2:
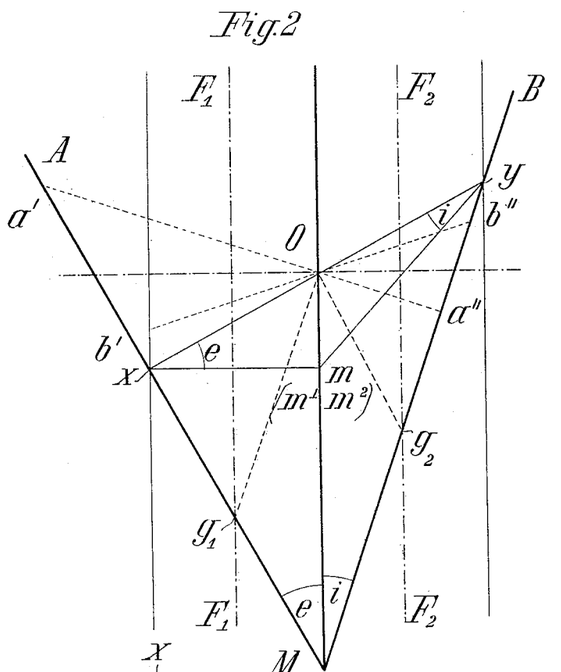
Figs. 2 and 2ᵃ serve to illustrate the principle of the positive actuating mechanism employed in the said apparatus.
Figure 2A:
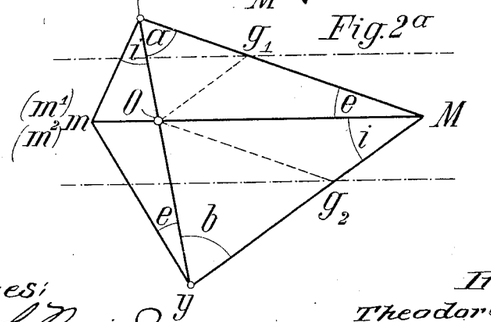

The apparatus shown in Fig. 1 in side elevation and in Fig. 1ᵃ in plan consists of a photographic reproducing apparatus which is provided with all the devices that are necessary to carry out projective alterations of image in a systematic manner. For this purpose the frames $r\,s$ and $v\,w$, which are designed to receive the original and the plate-holder for the image, are arranged to rotate on vertical axes $x\,x'$ and $y\,y'$, that are mounted in the supports $f\,g$ and $h\,k$. These supports are capable of being shifted rectilinearly and perpendicularly to the axis of the objective. The shifting of the supports $f\,g$ and $h\,k$ parallel to the plane of the objective and in opposite directions at the same time takes place along the straight guides T T and is effected by the lever E, which is pivoted on the pin $e'$ and is actuated by means of a screwed spindle I and a nut K. The rotary motions of the plane of the original and the plane of the image relatively to each other and to the plane of the objective are effected by means of a positive actuating mechanism in such a manner that both the conditions (stated at the commencement hereof) of clearness of definition of the image are satisfied, and therefore when the apparatus has been once rectified it will produce permanently clearly-defined images. The said positive actuating mechanism consists of a screwed spindle J, which is arranged in the objective plane and drives a nut K', carrying two pivoting-guides L, in which can slide arms P, rigidly connected to sleeves S, mounted loose on the parallel rotary axes $x\,x'$ and $y\,y'$ of the supports $r\,s$ and $v\,w$. The rotary motion of the sleeves S is transmitted by means of suitable mechanism—such as, for instance, bevel-wheel gearing G—in the same amount, but in the opposite direction of rotation to the rotary frames $r\,s$ and $v\,w$. The mode of operation of this positive actuating mechanism is illustrated by Fig. 2.

The first condition to be satisfied in order to produce clearness of definition of the image is the following: The plane of the original, the plane of the image, and the plane of the objective must always intersect one another in a straight line M. As in the great majority of cases only slight inclinations of the plane of the original and the plane of the image are required, this straight line M is situated as a rule far outside the apparatus, and it is therefore difficult to utilize it for the purposes of construction. Consequently it is necessary to substitute for this straight line M another but more easily-followed mark $m$. If, as shown in Fig. 2, the distances of the axes of rotation $x\,x'$ and $y\,y'$ from the plane of the objective M O are made equal to each other and to twice the focal length of the objective employed and if the angle $O\,x\,m'$ equals angle $O\,M\,x = e$, angle $O\,y\,m^2$ equals angle $O\,m\,y = i$, then the triangle $O\,x\,M$ is similar to the triangle $O\,m\,x$. The triangle $O\,y\,M$ is similar to the triangle $O\,m\,y$, because all their angles are equal. Therefore $$O\,M \cdot O\,m' = \overline{O\,x}^2$$

$$O\,M \cdot O\,m^2 = \overline{O\,y}^2$$

but as it was assumed that $O\,x$ equal $O\,y$ then $O\,m'$ equal $O\,m^2$ equal $O\,m$—that is to say, $m'$ and $m^2$ meet at the point $m$. Now this point $m$ is very convenient for use for the purposes of construction, and its place is taken by the nut K'. The rotary arms P take the place of the lines $m\,x$ and $m\,y$, and the supports $r\,s$ and $v\,w$ take the place of the lines $M\,x$ and $M\,y$. The bevel-wheel gearing or other mechanism employed makes the angles of rotation $e$ and $i$ of the arms P and of the supports $r\,s$ and $v\,w$ equal to each other and opposite in direction. Further, the arms P by reason of their pivoting-guides L meet always at the point $m$ of the plane of the objective. Consequently the picture-planes of the supports $r\,s$ and $v\,w$ will be caused to intersect each other always in the straight line M in the plane of the objective; but since $O\,x$ equals O $y$ then the counter-planes O $g_1$ and O $g_2$ divide the triangle $x$ M $y$ into the two similar and equal triangles $x$ $g_1$ O and O $g_2$ $y$ and the parallelogram O $g_1$ M $g_2$, and $x$ $g_1$ equals $g_1$ M and $y$ $g_2$ equals $g_2$ M. The straight lines $g_1$ and $g_2$ are situated at half the distance of the straight lines $x$ $x'$ and $y$ $y'$ from the plane of the objective, and they lie, therefore, in the focal planes. In this manner the two conditions for producing clearness of definition of the image are strictly satisfied.

Fig. $2^a$ illustrates a modification of the positive actuating mechanism just described. In this case the distance of the axes of rotation $x$ $x'$ and $y$ $y'$ from the plane of the objective are variable; but they must also in this modification be capable of being moved to and fro in straight guides parallelly to the plane of the objective. If, as shown in Fig. $2^a$, angle O $x$ $m'$ equals angle O M $y = i$, angle O $y$ $m^2$ equals angle O M $x = e$. Then triangle O $x$ M is similar to triangle O $y$ $m^2$ and triangle O $y$ M is similar to triangle O $x$ $m'$. Therefore $$\frac{O\ M}{O\ x} \cdot \frac{O\ x}{O\ m'} = \frac{\sin.\ a \sin.\ b}{\sin.\ e \sin.\ i} = \frac{O\ M}{O\ y} \cdot \frac{O\ y}{O\ m^2}$$

Consequently O $m'$ equals O $m^2$ equals O $m$—that is to say, $m'$ and $m^2$ meet at the point $m$. From this it follows that if the point $m$ be determined in the manner shown in Fig. $2^a$—namely, by drawing the angle $e$ at $y$ and the angle $i$ at $x$ on the opposite side of M—then the distances of the axes of rotation $x$ $x'$ and $y$ $y'$ need no longer be equal to each other and to twice the focal length of the objective employed; but the positive actuating mechanism requires to be arranged in a somewhat different manner. A nut K' with pivoting-guides moves along the plane of the objective. The arms P, sliding in the guides of the nut K', rotate the sleeves S, which are mounted loose on the axes $x$ $x'$ and $y$ $y'$; but the rotary movements of these loose sleeves S are now no longer transmitted to the supports for the original and image mounted on the same axis, but are transmitted by means of suitable mechanism (cord-gearing, parallelo guides, &c.) to the oppositely-situated supports for the original and image in equal angles, but in opposite directions. With this arrangement the clearness of definition is not absolutely insured, as in the arrangement before described, and it is maintained only when it has been once obtained—namely, in Fig. $2^a$ the counter-axes $g_1$ and $g_2$ will move strictly parallel to the plane of the objective, so long as $x$ and $y$ are likewise moved parallel to the plane of the objective. Consequently when these counter-axes have been set in the focal planes by having once obtained the clearness of definition of the image they will remain in those planes and the clearness of definition of the image will likewise be maintained.

For the purpose of also satisfying the highest requirements and of facilitating an exact rectification of the apparatus the following arrangement is further provided: Two slit-aperture lamps $p$, which are respectively keyed fast on the vertical axes of rotation $x$ $x'$ and $y$ $y'$ of the supports $r$ $s$ and $v$ $w$, throw beams of light constantly in the direction of the planes of the original and of the image. When all the parts are in the middle position, those beams of light must coincide with the sights provided on the supports $f$ $g$ and $h$ $k$, and when the supports $r$ $s$ and $v$ $w$ are inclined sufficiently they must meet in a straight line M on the screen $u$, situated in the plane of the objective.

In cases where the requisite inclinations of the planes of the original and image are so great that the positive actuating mechanism no longer suffices the positive actuating mechanism may be thrown out of engagement, and then the beams of light will serve also as sighting and adjusting means for causing the two planes to intersect the plane of the objective always in the straight line M.

Certain devices are also provided for the purpose of rendering the apparatus capable of solving even the more difficult problems which can be controlled by mathematical calculations. Such devices are: Division-marks, which indicate the respective distances of the vertical axes of rotation $x$ $x'$ and $y$ $y'$ from the optical axis of the objective; divided circles, which allow of reading off the angles $e$ and $i$ through which the supports $r$ $s$ and $v$ $w$ are rotated; a turn-table U, constructed in the support $r$ $s$, so as to allow when inserting a picture into the apparatus of setting the axis of collineation or the counter-axis of the picture parallel to the axes of rotation of the supports.

Finally, it is also possible to produce oblique transformations by reason of the fact that the dulled-glass plate or photographic-plate holder, as also the frame of the original, can be shifted also in a vertical direction—that is to say, parallel to the axis of rotation $x$ $x'$ and $y$ $y'$ of the supports of the original and image—and these rotary movements can be measured by division-marks or by reason of the fact that the dulled-glass screen or holder, as also the frame of the original, can be shifted in a horizontal position—that is to say, perpendicularly to the axis of rotation $x$ $x'$ and $y$ $y'$ of the supports of the original and image—and these shifting movements can be measured by means of division-marks. It is possible to alter the scale of the projective alteration of the picture. By this means the apparatus is rendered capable of producing any kind of alteration of image, projective or affinite. The nature of this constructional form is not altered in any way when, as is usual in large installations, the original is placed in a brightly-lighted chamber and the support of the image is in a dark room and the objective is situated in the partition separating the two rooms, or if the supports of the original and of the image are constructed in the form of complicated portable frameworks for the purpose of producing the necessary movements and for the purpose of producing correct lighting effects, or if for this purpose or with the object of enabling variable increases to be make within wide limits the positive actuating mechanism is constructed in a different manner for the purpose of producing a constant clearness of definition of the image.

Figure 3:
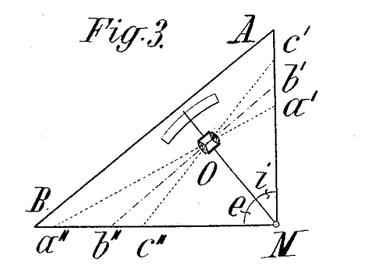
Fig. 3 is a diagram, and Fig. 3ᵃ is a sectional view, of a practical construction of apparatus designed for the production of alterations of image only within certain limits, but with great accuracy.
Figures 3A, 3B:
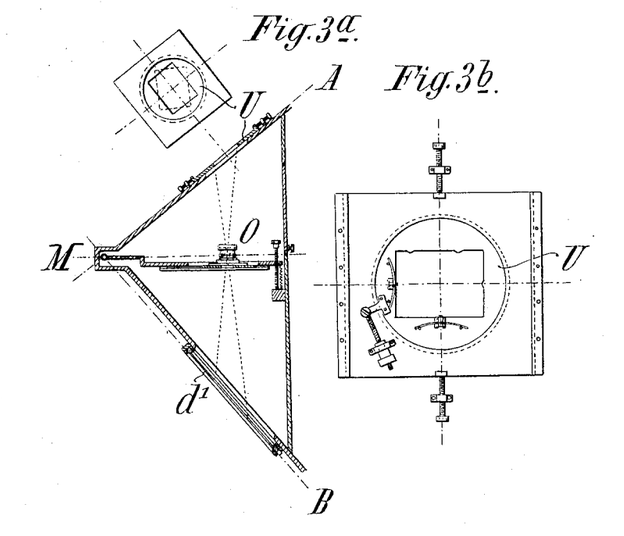

Fig. 3 shows diagrammatically and Figs. 3ª and 3ᵇ illustrate the practical construction of an apparatus designed only for exactly-determined but rather large alterations of image in a relatively small sized picture. It has externally the form of a three-sided prism. In one edge M is mounted an axle, on which can turn the objective wall M O in the interior of the apparatus. The image $a'$ $b'$ $c'$, which it is desired to alter, is inserted in the turn-table U and is placed within its axis of collineation parallel to the edge M of the apparatus. When the apparatus has been rectified, the desired transformation $a''$ $b''$ $c''$ will at once appear on the dulled-glass screen $d'$ of the apparatus.

Figure 4:
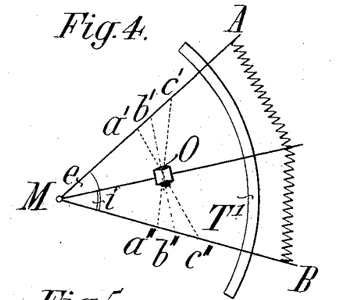
Figs. 4, 5, and 6 illustrate diagrammatically modifications of the apparatus shown in Fig. 3.

Fig. 4 shows diagrammatically an apparatus for allowing of transformations within much wider limits. In its basic form it is similar to the apparatus shown in Fig. 3; but the two planes M A and M B are capable of coarse and fine adjustment relatively to the objective plane M O through large angles by means of the circular bar T'. Its common axis of rotation is the so-called "axis of distortion" M. The light-proof closure is effected by devices, such as bellows, &c., which allow of large alterations of dimensions. The mode of operation of this apparatus is the same as that of the preceding apparatus, except that it has a greater scope of degrees of distortion.

Figures 5, 6:
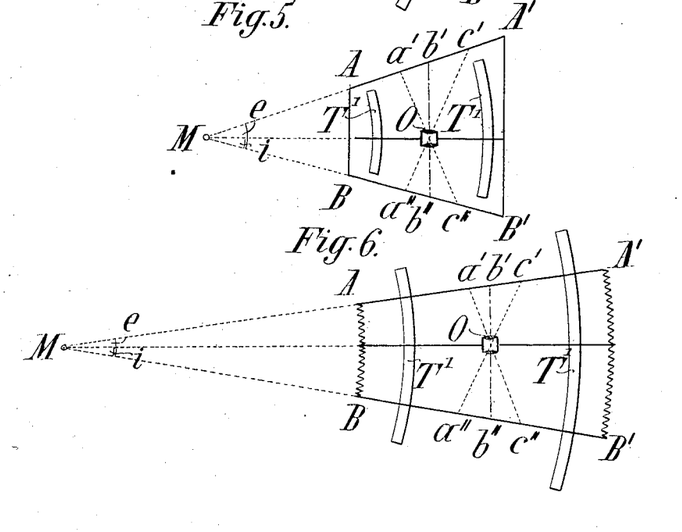

Fig. 5 shows an apparatus designed again only for exactly-determined moderate transformations, but for larger sizes of picture than the apparatus shown in Fig. 3. Externally it has the form of a four-sided prism. The planes M A and M B and the plane M O of the objective intersect one another in a straight line (M) outside of the apparatus. The plane of the objective can be shifted in the interior of the apparatus along circular bars T', which are concentric to M. Its mode of operation is analogous to that of the two apparatus just before described.

Fig. 6 illustrates an apparatus which again allows of effecting alterations of a picture within rather wide limits. In its basic form it is similar to the apparatus shown in Fig. 5, but the walls A A' and B B' are connected by means of bellows, &c., and are therefore rendered movable. The walls A A' and B B' can be shifted with coarse and fine adjustment relatively to the objective wall M O through large angles along circular bars T', which are concentric to M. The common axis of rotation M is situated outside of the apparatus. The mode of operation of this apparatus is also analogous to that of the two preceding forms. In the apparatus described with reference to Figs. 3, 4, 5, and 6 the original $a'$ $b'$ $c'$ and the objective O and the projection image $a''$ $b''$ $c''$ are adjustable with fine and coarse adjustment in slides perpendicularly to the axis of rotation M within wide limits, and the amount of this shifting may be measured by division-marks, the zero-marks of which lie in the axis of distortion M of the apparatus.

The original is further mounted in a turn-table U, which is capable of rotating, with coarse and fine adjustment, on an axis perpendicular to the respective plane A or B. Division-marks along the slides having their zero-points situated in the axis of distortion M and also divided circles for measuring the angles $e$ and $i$, through which the rotating walls can be rotated, allow of an exact adjustment of the distance of the counter-axis from the axis of collineation, of the distance of the objective from the axis of collineation, and of the angles $e$ and $i$, which the planes of the original and image must make with the plane of the objective. The type of apparatus to which the above four apparatus belong, and which is characterized by the fact that the planes of the objective and image intersect one another at all times actually in a straight line, by reason of the construction of the apparatus, allows, like the slide apparatus, of the use of a positive actuating mechanism, which secures the permanent fulfilment of also the second condition for obtaining clearness of definition of the image, whereby an apparatus is provided which gives a constant clear definition, and thereby considerably simplifies the work. Two constructional forms of these apparatus will now be described. The apparatus illustrated in Figs. 7, 7ª, and 7ᵇ consists of a hollow three-sided prism M B V, of which the angle $i$ at M (the axis of collineation) may be any desired angle. In the wall M V a photographic objective O is capable of being moved to and fro in a straight guide. A dulled-glass screen or plate-holder or a diapositive frame $d'$ may be inserted in the wall M B. The edge M also constitutes the axis for a rotary wall M A, which is connected, by means of a light-proof bellows, to the prism-wall M V and is provided along its entire length with a straight guide for a dulled-glass screen or a holder or a diapositive frame $d^2$. The rotary motion of the wall M A is connected with the to-and-fro motion of the objective O in the wall M V in a positive manner, such that the distance O $g_1$ from the optical center (the first nodal point) of the objective to the counter-axis ($g_1$) in the plane M A (sensitive film) measured parallel to the wall M B remains constant $$\left(O\ g_1 = \frac{F}{\sin. i}\right)$$

Figure 7:
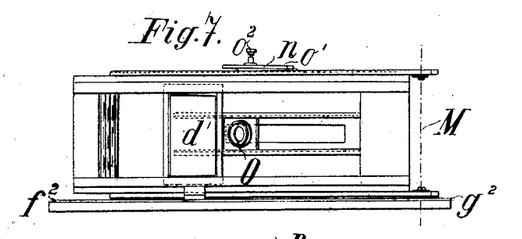
Figs. 7, 7ᵃ, and 7ᵇ are respectively a plan, a side elevation, and a section of a constructional form of apparatus which secures the permanent fulfilling of the second condition of clearness of definition of image and which has resulted from the original form shown in Fig. 3.
Figure 7A:
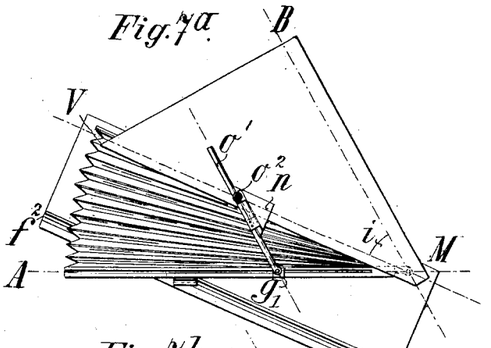
Figure 7B:
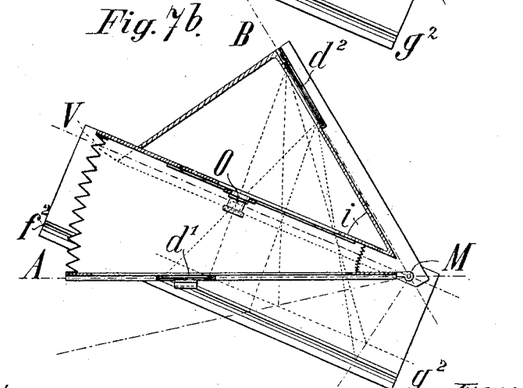

The arrangement for the positive movement of the objective O, which is dependent on the rotary motion of the wall M A, consists of a right-angle triangle $n$, which is fixed to the latter and which is similar to the triangle M V B and which slides, with its longer cathetus, in a straight guide along the wall M V, while the pivot $g_1$ in the plane M A can slide in a slot-guide, so that this plane, as well as the support $d'$, (dulled-glass screen, holder, or frame,) will share all the motions of the objective O. For the purpose of effecting rectifications the pivot $g_1$ is not arranged direct on the triangle $n$, but on the end of a straight-edge $o'$, which can be shifted along the hypotenuse of the triangle $n$ and be fixed by means of a set-screw $o^2$. As will be readily seen, this compulsory connection may also be effected in many other ways. As, further, the angle $i$ may vary and may also be of different size, the general rule for this compulsory connection is that by its means the counter-axes—that is to say, the straight lines of intersection of the planes drawn through the optical nodal points ($h_I\ h_{II}$) of the objective parallel to the planes A and B with the latter planes—must be obtained in the focal planes of the objective O. Further, the axis of collineation M or the edge M of the prism instead of being real, as in the examples herein described, may be merely imaginary, if they cannot be brought within the apparatus by reason of want of space. For the same reason it is immaterial for the nature of the apparatus whether the supports $d'\ d^2$ (dulled-glass screen, holder, or diapositive frame) be fixed in the walls M A and M B or be made movable in the direction of the axis of collineation M or perpendicularly to the same or whether they are capable of rotating on axes which are perpendicular to the planes of the original and image. Apparatus of this kind are suitable not only for affinite distortions, but also for generally projective distortions of all kinds and degrees. When an original is transformed from the plane M A onto the plane M B and then after shifting the objective O and the plane M A it is transformed back onto the latter, then the two pictures in the plane M A will be affinite at right angles to each other, when the picture on the plane M B (intermediate image) has remained exactly in the same place in both operations, while the dimension in the direction of the axis M remains unaltered; but the two pictures on the plane M A will be obliquely affinite to each other when the intermediate image on the plane M B has been shifted in the direction of the axis M. Finally they become generally projective to each other when the intermediate image has been shifted perpendicularly to the axis M. A simple generally projective distortion is produced when only one of the two operations is carried out, and the transformation is effected from the plane M A onto the plane M B or, reversely, from M B onto M A; but complicated projective distortions are produced when the axes of collineation intersect or cross one another, if the intermediate image was rotated on an axis which is perpendicular to the plane of the intermediate image M B. It is also of advantage to connect together in a compulsory manner not only the rotary motion of the planes M A and M B, but also the shifting movements of the supports $d'\ d^2$ (dulled-glass screen, plate-holder, frame) with the movements of the objective O. This can be done very easily by causing any desired point or part of the support $d'$ to describe a compulsory movement parallel to the plane of the objective—for instance, by means of a straight guide $f^2\ g^2$, parallel to the objective plane M V at any desired distance from the latter or by connecting the support $d'$ to the pivot $o'$.

Figure 8:
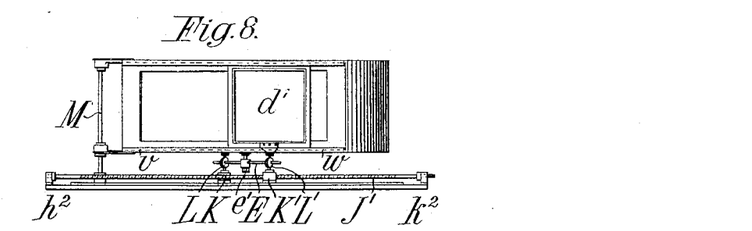
Figs. 8, 8ᵃ, and 8ᵇ are respectively a plan, a horizontal section, and a vertical section of a second constructional form of apparatus fulfilling this condition and arranged in the form of a book.
Figure 8A:
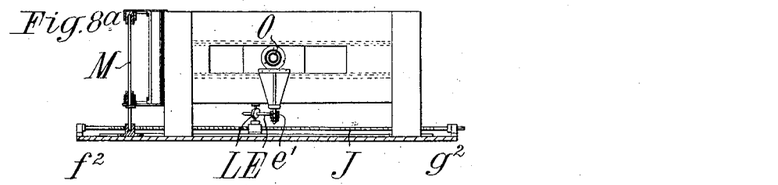
Figure 8B:
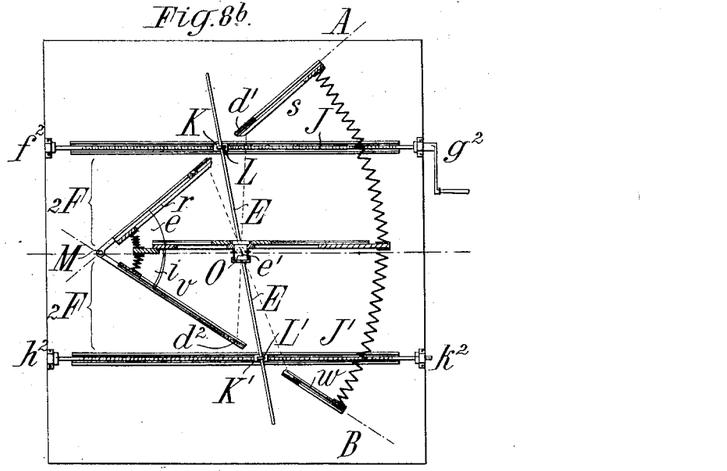

The above-described apparatus is based on the assumption that the angle $i$ which the plane M B makes with the objective plane M V can be kept constant and can be rendered invariable by construction. This of course limits the utility of this apparatus, and it is of advantage to have a construction of the positive-actuating mechanism which allows of rendering both planes (original and image) capable of rotation. Figs. 8, 8$^a$, and 8$^b$ illustrate an apparatus having the shape of a book which is provided with the original and image planes capable of rotating on both sides and with a positive-actuating mechanism, and it satisfies the requirements. Its construction is as follows: The base-board on which the apparatus is mounted carries at a distance equal to twice the focal length (2 F,) of the objective employed from the objective plane O M on both sides of it a straight guide $f^2\ g^2$, and $h^2\ k^2$ with a spindle-driving mechanism J and J$'$, in which a nut K and K$'$ works to and fro. These two nuts K and K$'$ are provided each with a rotary guide-sleeve L L$'$ in which a two-armed lever E slides with its ends and has its pivot $e'$ situated vertically under the optical center of the objective O and which has the effect of causing these two nuts and the objective to remain at all times in a plane. These two nuts K K$'$ are further pivoted to slide-blocks which slide in straight guides $r\ s$ and $v\ w$ of the planes M A and M B, that are pivoted on the common axis of distortion M of the apparatus and which carry with them the supports $d'\ d^2$, which are capable of moving in the picture-walls. The mode of operation of this apparatus resulting from this construction is a very simple one. As each of the spindles J J$'$ has a certain amount of friction, they can never slide passively, but can only act actively. Consequently the nut K or K$'$ which is not operated by its own spindle J or J$'$ will therefore always constitute a point of support and a pivot for the entire positive-actuating mechanism. When, therefore, the angle $e$, which the plane of the original M A must inclose with the plane of the objective M O, has been first adjusted with the help of the actuating mechanism, (in which operation it is not at all necessary to trouble about the second spindle drive J' in any way,) then the adjustment of the angle $e$ has been finally effected and is only necessary to adjust the angle $i$ which the plane M B of the transformation must inclose with the plane M O of objective with the help of the second spindle drive J'. In this manner the objective O has automatically moved into its former position. The images are clearly defined and show the desired alteration. As already repeatedly stated, an affinite alteration of image may be considered as being the sum or the difference of two or more projective transformations. Since in many cases the intermediate image has no practical value and its production entails time and labor and constitutes a not unappreciable cause of mistakes, it has been proposed by arranging two apparatus in series—*i. e.*, one behind the other—to produce the desired affinite alteration of image in one operation. The problem of producing directly affinite alterations of image without fixing an intermediate image is always dependent on the condition that the counter-axis of the intermediate image which appertains to the two optical systems shall coincide in a straight line; but this may be effected in a great variety of ways, namely:

First. By collimation of two optical systems with each other—that is to say, by such arrangement of the said systems that their focal planes shall coincide—any desired plane image can be reproduced by such a combination only in an affinite manner, because the plane of the intermediate image can intersect the common focal plane only in a straight line. Since the ratio of the scale of the two affinite pictures is always determined by the ratio of the distances of the axes of collineation of the two picture systems from the common counter-axis, therefore this ratio of the scales is fixed in this case by the ratio between the focal lengths of the two optical systems.

Second. By causing the focal plane of one optical system to coincide with the counter-plane of the other optical system and by insuring that the counter-plane of the first system and the focal plane of the other system shall intersect the latter plane which is common to both optical systems in a straight line. In such a case all pictures having their planes parallel to the counter-plane of the first system will be reproduced affinitely and the affinitely-altered images will lie in planes which are parallel to the counter-plane of the second system; but so long as the distances of the axes of collineation of the two pictures systems from the common counter-axes are variable then the scale of the affinite image will be variable also.

Third. The two optical systems may be arranged at any desired angle to each other.

As the counter-axes of the intermediate image meet each other in a straight line and must be situated in the focal planes of the two optical systems, only an affinite image can be produced when the straight line of intersection of two focal planes becomes the common counter-axis of the intermediate image. From this follows that the mutual or relative position of the two optical systems to each other determines the position of the two counter-planes, and thereby also determines the position in space of these picture-planes parallel to the said counter-planes if a directly affinite image is to be reproduced at all. When the two optical systems are connected rigidly with each other, then this position in space of the two picture-planes is invariable. When the relative position of the two optical systems is altered, either by rotation or by parallel movement, the counter-planes will rotate and likewise also the picture-planes. The foregoing considerations form the basis for the hereinafter-described constructional forms of apparatus for producing directly affinite alterations of image.

Figure 9:
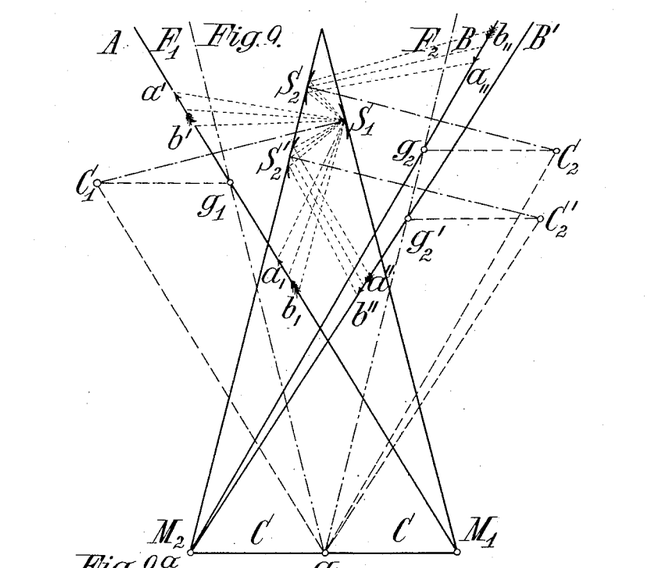
Figs. 9 and 9ᵃ are diagrammatic representations of an apparatus which is adapted to produce affinite alterations of image without the production of an intermediate image and in which only mirrors are employed.
Figure 9A:
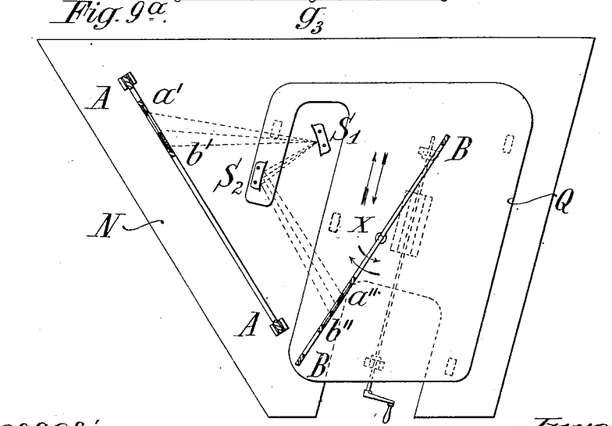

Figs. 9 and $9^a$ illustrate an apparatus comprising two hollow mirrors $S_1$ and $S_2$, mounted at a fixed angle to each other, one of the two mirrors ($S_2$) being capable of movement along its vertex plane. By this arrangement the counter-axes $g_3$ of the intermediate image are fixed invariably as the straight line of intersection of the two focal planes $F_1$ and $F_2$ in space. Similarly in the case of the counter-plane $C_1$ $g_3$ of the stationary mirror $S_1$ the counter-plane $C_2$ $g_3$ of the movable mirror $S_2$ rotates within narrow limits on the counter-axis $g_3$. When it is desired to obtain merely images in the natural size, the plane C of the intermediate image must be so drawn through $M_1$ $g_3 = M_2$ $g_3$—that is to say, the distances of the two axes of collineation from the counter-axis are equal to each other. By this means the plane A of the original $a'$ $b'$ is also unalterably fixed because it must be drawn through the axes of collineation $M_1$ parallel to the counter-plane $C_1$ $g_3$, and the plane of the affinitely-altered image is determined by the plane which is drawn through the axis of collineation $M_2$ parallel to the counter-plane $C_2$ $g_3$. This plane is also capable of rotating only within narrow limits, like the counter-plane $C_2$ $g_3$.

Fig. 9 illustrates diagrammatically the path of the rays for two positions of the mirror $S_2$. Fig. $9^a$ shows also diagrammatically the constructional arrangement of the apparatus. The mirror $S_1$ and the support A A of the original $a'$ $b'$ are mounted rigidly on a baseboard N in the relative position which has been found by Fig. 9. The mirror $S_2$ and the axis of rotation $x$ of the supports B B of the transformed image $a'' b''$ must, on the contrary, be mounted on the movable board Q in such a manner that the axis of rotation $x$ shall lie in the focal plane $F_2$ of the mirror $S_2$. The support B B is capable of rotation within narrow limits on the axis $x$. The baseboard of the mirror $S_1$ and that of the mirror $S_2$ are connected in such a manner that the mirror $S_2$ and the axis $x$ can be shifted parallel to the vertex plane of the mirror $S_2$ relatively to $S_1$. The frame of the original $a' b'$ is freely movable along A A and the frame of the transformed image $a'' b''$ is freely movable along B B. Suitable means, such as bellows or the like, are provided for the purpose of rendering the whole light-proof. In use the original is placed in its support A A so that an image is produced on B B which can be rendered clearly defined by rotating B B on the axis $x$. By shifting the mirror $S_2$ and the axis $x$ with the actuating-screw provided for that purpose and by constantly keeping the image clearly defined by rotating B B as required the desired affinite alteration of image will be produced.

Figure 10:
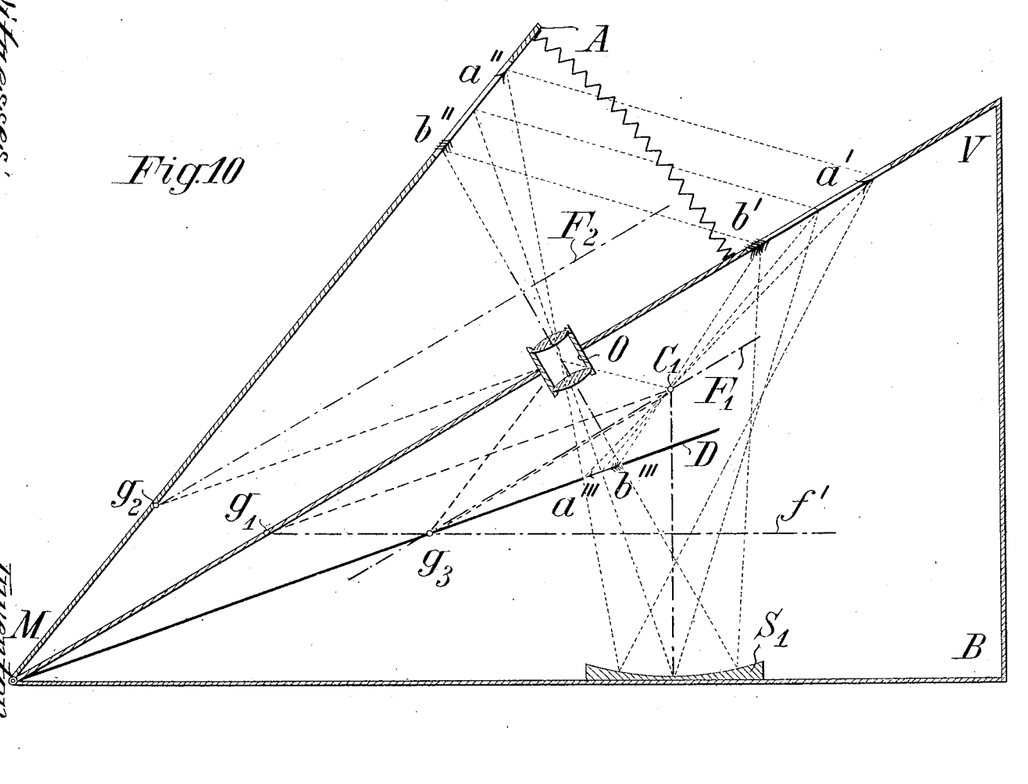
Fig. 10 shows, likewise diagrammatically, an apparatus which produces in a direct manner affinite alterations of image and in which a mirror is combined with an objective.

Fig. 10 shows the combination of a lens with a mirror and also an example of an arrangement in which one of the focal planes of the objective is caused to coincide with the counter-plane of the mirror. Further, by the fact that not only the counter-axes, but also the axes of collineation of the intermediate image, are common in both picture systems—that is to say, the distance of the axes of collineation from the counter-axis is the same in both picture systems—the scale is kept constant and the reproduction in the natural size is insured. In its external shape the apparatus is similar to the apparatus shown in Fig. 7. At the place where the intermediate picture is fixed by photography in the latter there is in this case a spherical hollow mirror built in the apparatus. The original $a' b'$ is mounted so as to be capable of movement in the wall M V of the box M V B and also capable of rotation in a turn-table. The hollow mirror $S_1$ is mounted on the wall M B in such a manner that M B forms its vertex plane. It reflects the original $a' b'$ reduced, inverted, and projectively altered as a virtual image $a''' b'''$ in the plane M D. This virtual image is received by the objective O, which is movable in the wall M V and is projected thereby into the plane M A. The image $a'' b''$ produced at that place is a directly affinite alteration of image of the original $a' b'$. The degree of affinity may be altered by shifting the original $a' b'$ and the objective O. The straight line connecting the center of the mirror with the center of the objective O determines the direction of the affinity-rays. The picture plane M A rotates on the common straight line of intersection (M) of the four planes M V, M B, M D, M A. The plane M A is, as in the apparatus shown in Fig. 7, moved positively in all the movement of the objective O, so that a constantly clearly defined image is likewise produced.

Figure 11:
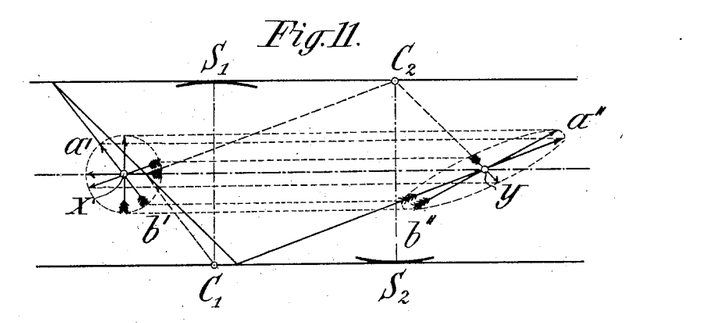
Figs. 11 and 11ᵃ illustrate in like manner an apparatus for directly affinite alterations of image in which only mirrors are employed.
Figure 11A:
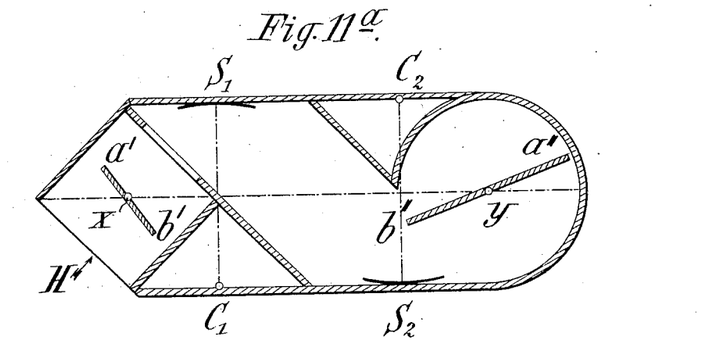

Figs. 11 and 11ª illustrate a combination of two mirrors collimated with each other—that is to say, of two mirrors having such relative positions that their focal planes coincide with each other. The ratio of focal lengths of the two optical systems is 1:1. Consequently the affinite image is produced also in this case in natural size. The two mirrors collimated with each other are mounted in the box that contains the supports of the original $a' b'$ and of the image $a'' b''$, which is to be affinitely altered and which are capable of rotating on parallel axes of rotation $x$ $y$, situated in the focal plane of the mirror. The original $a' b'$ is illuminated from H. The rays pass through a screen and fall upon the mirror $S_1$, which reflects them with the production of an intermediate image (that need not further be considered) onto the mirror $S_2$, which combines them again to form the affinitely-altered image $a'' b''$. When the geometrical locus of the original in all possible positions is a circular cylinder, then, as shown in Fig. 11, the geometrical locus of all possible positions and dimensions of the affinitely-altered image is an elongated elliptical cylinder.

Figures 12A, 12B:
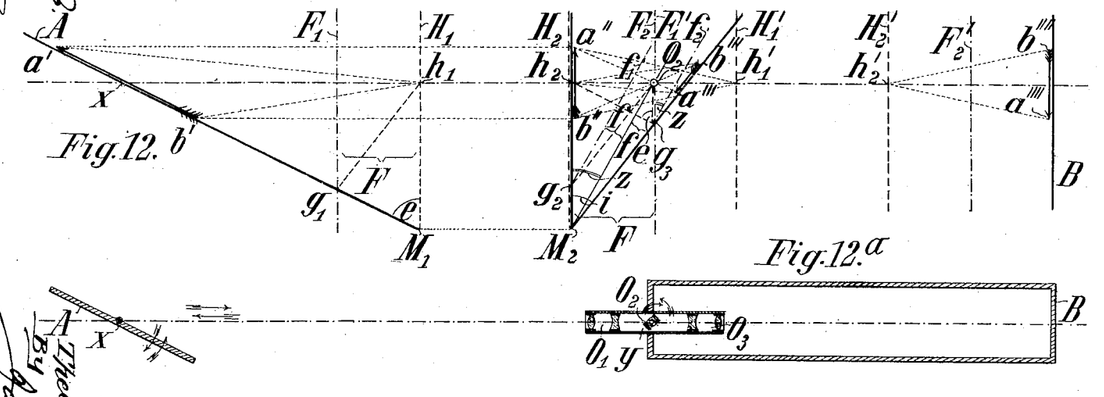
Figs. 12 and 12ᵃ illustrate an apparatus for directly affinite alterations of image in which only lenses are employed.

Finally, Figs. 12 and 12ª illustrate apparatus in which the directly affinite alteration of image is produced by a combination of lenses and in which the rear focal plane $F_2$ of the first optical system is caused to coincide with a counter-plane $O_2$ $q_3$ of the second optical system by rotating the lens $O_2$ and in which, further, by the fact that the three planes of the original, the intermediate image, and the affinite image intersect one another in a straight line the unalterability of the scale of the image is insured as well as the production of an image in the natural size. Fig. 12 illustrates the theory of the instrument with the omission of all concrete parts, (lenses, walls, &c.) Fig. 12ª, however, illustrates diagrammatically the constructional arrangement of the apparatus. The tele-objective $O_1$, Fig. 12ª, with the principal planes $H_1$ and $H_2$, Fig. 12, produces, with the obliquely-placed original $a' b'$, the projective intermediate image $a''' b'''$. This image $a''' b'''$ is transformed into the virtual image $a'' b''$, which is affinite to the original $a' b'$ by means of a lens $O_2$ capable of rotation on an axis which is drawn through the rear focus of the tele-objective parallel to the axis of rotation $x$ of the original $a' b'$ before it is converted into a virtual image. This virtual image is finally projected by the lens system $O_3$ as an inverted real image $a'''' b''''$ of the same dimensions onto the picture plane B B.

In order that the image may become an affinite image, the following conditions must be satisfied: First. The optical center of the rotary lens $O_2$ must coincide with the rear focus of the front system $O_1$. Second. The focal plane $f_2$ of the rotary lens $O_2$ must pass through the counter-axis $g_3$ of the intermediate image, which has already been determined by the inclination of the original $a'b'$. Third. The original $a'b'$ must be moved parallel to itself at such a distance $h_1$ from the tele-objective that the straight line of intersection $M_2$ of the objective plane of $O_2$ with the second principal plane of the tele-objective $H_2$ and the straight line of intersection $M_1$ of the plane A of the original $a'b'$ with the first principal plane $H_1$ of the tele-objective shall become conjugate straight lines in an optical sense. These three conditions may also be stated mathematically by the following equations:

$$\frac{F}{\tan. e} = \frac{f}{\sin. Z}; \quad \frac{F}{\tan. Z} = \frac{x \, h_1}{\tan. e},$$

where F equals the equivalent focal length of the tele-objective, $f$ equals the focal length of the rotary lens, $e$ equals the angle inclosed between the plane of the original and the principal planes of the tele-objective, Z equals the angle inclosed between the objective plane of the rotary lens and the principal planes of the tele-objective, and $x \, h_1$ equals the distance of the axis of rotation $x$ of the original $a'b'$ from the first nodal point $h_1$ of the tele-objective. Consequently in the constructional arrangement of the apparatus the following provisions are made for three movements: (a) The lense $O_2$ is capable of rotating on an axis $y$ and its angular rotation can be read off on a divided circle; (b) similarly the original is capable of rotation on the axis $x$ and its angular rotation can be read off on a divided circle. (c) Finally, the frame of the original $a'b'$, with its axis $x$, is capable of axial movement, and the distances of the axis $x$ from the first nodal point $h_1$ of the tele-objective $O_1$ can be read off on a longitudinal scale. All the remaining parts are essentially rigidly connected together and are made movable or adjustable solely for purposes of rectification. The optical systems $O_1$ and $O_3$ are tele-objectives for the purpose of moving the lenses themselves as near as possible to each other, and thus increasing the field of vision by utilizing the fact that the principal planes of such systems are situated far outside of the lenses.

I claim—

1. In an apparatus for the systematic transformation of plane pictures, means for intersecting in a straight line the planes of the original image and objective, or mirror means for altering the angles inclosed by the said planes, means for shifting the original, image and objective or mirror in their planes, and rotatable means for placing any straight line of the original or image parallel to the axis of the distortion of the apparatus.

2. A photographic reproducing apparatus comprising objectives whereby the two principal planes cannot be considered to coincide with the objective planes in which the plane of the original and the first principal plane of the objective and the plane of the projected image and the second principal plane of the objective are arranged to intersect one another in parallel straight lines, means for altering the angles inclosed by the four planes, means for shifting the original, projected image and the objective in their planes, and rotatable means for adjusting the original or image or both with the axis of collineation parallel to the axis of distortion of the apparatus.

3. In an apparatus of the character described, sighting devices, said sighting devices adapted to cause the planes of the original and image to intersect the objective plane exactly in the same straight line.

4. In an apparatus of the character described, mechanism for automatically satisfying the two conditions for clearness of definition of the image, said means consisting of a slide apparatus provided with a transverse supporting member and supports for the original and image mounted upon said member, said support mounted for rotation on parallel axes and laterally adjustable, the lateral movements and the rotary movements of the said supports relatively to the objective or mirror and to its optical axis are coupled together positively.

5. In an apparatus of the character described, a positive actuating mechanism for producing and maintaining constant clearness of definition of image, said mechanism comprising supports for the original and image, said supports mounted for rotation on parallel axes, a loose sleeve mounted on each of the said axes, a pair of pivoting-guides, operating means for said guides, connections between the guides and the sleeve for imparting movement thereto when the guides are operated, the rotary motion of said sleeves being transmitted in equal amounts but in opposite directions to the supports mounted on the opposite axis, while the two axes of rotation and the optical center of the objective remain always in one plane.

6. In an apparatus of the character described, a positive actuating mechanism for producing and maintaining positive clearness of definition of image, said mechanism comprising supports for the original and image, said support mounted for rotation on parallel axes, a loose sleeve mounted on each of the said axes, a pair of pivoting-guides arranged in the objective plane, operating means for said guides, a pair of arms connecting the guides to the sleeves, said guides adapted to impart rotation to the said sleeves when said guides are operated, means for transmitting the rotary motion of said sleeves in equal amounts but in opposite directions to the supports mounted on the same axes while the said axes and the optical center of the objective remain in one plane, in combination with means for moving the axes of rotation of the said supports parallel to the objective plane at a distance equal to twice the focal length of the objective.

7. In an apparatus of the character described, means for rotating the original, image and objective or mirror on a common axis so that the planes of the original, image and objective will intersect one another always in the same straight line.

8. In an apparatus of the character described, the combination with an objective or mirror and means for imparting rotary movements to the planes of the original and image, of means for establishing a positive connection between the movements of the objective or mirror and the rotary movements of the planes of the original and image whereby the geometrical counter-axes are maintained permanently in the focal planes of the objective or mirror and obtain clearness of definition of image.

9. In an apparatus of the character described, the combination with a mirror, the original, the image, supports for the original and image, and means for imparting rotary movements to the planes of the original and image, of means for establishing a positive connection between the movements of the mirror and the rotary movements of the planes of the original and image and between the movements of the supports of the original and image, whereby the geometrical counter-axes are maintained permanently in the focal plane of the mirror, thereby obtaining clearness of definition of image.

10. In an apparatus of the character described, a positive actuating mechanism for producing and maintaining constant clearness of definition of image, in which the angle inclosed by the plane of the original or image and the plane of the objective is constant while the plane of the image or original is capable of rotating on the straight line of intersection of the first-mentioned plane with the plane of the objective, and a pivoting-guide for moving said mechanism, said guide operating always in the straight line of intersection of the focal plane of the objective or mirror and the counter-plane of the stationary original or image, whereby the axis of the pivoting-guide remaining always coincident with the counter-axis of the rotatable image.

11. In an apparatus of the character described comprising walls capable of rotation toward both sides, a device for producing positive movements for obtaining constant clearness of definition of image, a positive actuating mechanism consisting of the combination of two spindles or straight guides parallel to the plane of the objective or vertex plane of the mirror, nuts fitted on said guides and adapted to produce compulsory rotation of the plane of the original and image, a straight guide for guiding the objective or mirror in its own plane, and a lever pivoted in a straight line drawn through the optical center of the objective or center of curvature of the mirror and parallel to the axis of distortion of the apparatus, said lever adapted to keep the two nuts and the objective always in the same plane.

12. In an apparatus of the character described, a positive actuating mechanism for producing and maintaining constant clearness of definition of image in which the two planes of the original and image are capable of rotation on a common axis lying in the plane of the objective or mirror, and guides for rotating the two planes, said guides adapted to move parallel to the plane of the objective or mirror and further maintained together with the optical center of the objective or the center of curvature of the mirror in a plane parallel to the axis of rotation of the plane of the original or image.

13. An apparatus for producing direct affinite transformation of image comprising a pair of systems of lenses or mirrors capable of rotation relatively to each other.

14. In an apparatus of the character described, means for obtaining the direct production of affinite alterations of image, said means comprising two optical systems inclosing any desired, fixed or variable angle with each other.

15. An apparatus for the direct production of affinite alteration of image comprising a pair of optical systems, the focal plane between the said systems coinciding with the counter-plane of the other system.

16. An apparatus for the direct production of affinite alterations of image comprising two optical systems having their focal planes brought into coincidence with each other.

17. In a photographic reproducing apparatus, a plurality of spherical lenses or mirrors for obtaining a systematic transformation of plane pictures.

In testimony that I claim the foregoing as my invention I have signed my name in presence of two subscribing witnesses.

THEODOR SCHEIMPFLUG.

Witnesses:
  JOSEF RUBASCH,
  O. SWOBODA.